(12) United States Patent
Kern et al.

(10) Patent No.: US 9,188,248 B2
(45) Date of Patent: Nov. 17, 2015

(54) CABLE MANAGEMENT DEVICE

(71) Applicant: ARRIS Enterprises, Inc., Suwanee, GA (US)

(72) Inventors: Dale W. Kern, Manhattan, IL (US); Leonard Scott Huff, Shenzhen (CN)

(73) Assignee: ARRIS Enterprises, Inc., Suwanee, GA (US)

( * ) Notice: Subject to any disclaimer, the term of this patent is extended or adjusted under 35 U.S.C. 154(b) by 18 days.

(21) Appl. No.: 14/247,671

(22) Filed: Apr. 8, 2014

(65) Prior Publication Data

US 2015/0285406 A1 Oct. 8, 2015

(51) Int. Cl.

| F16L 3/22 | (2006.01) |
|---|---|
| F16L 3/23 | (2006.01) |
| F16L 3/06 | (2006.01) |
| F16L 3/26 | (2006.01) |
| F16L 3/12 | (2006.01) |

(52) U.S. Cl.
CPC ... F16L 3/23 (2013.01); F16L 3/06 (2013.01); F16L 3/1218 (2013.01); F16L 3/26 (2013.01)

(58) Field of Classification Search
CPC ............. F16L 3/23; F16L 3/1218; F16L 3/06; F16L 3/26
USPC ....................................................... 248/68.1
See application file for complete search history.

(56) References Cited

U.S. PATENT DOCUMENTS

| 3,263,261 A | 8/1966 | Schulz |
|---|---|---|
| 5,893,539 A * | 4/1999 | Tran et al. ................... 248/68.1 |
| 5,921,402 A | 7/1999 | Magenheimer |
| 6,361,000 B1 * | 3/2002 | Jette ............................... 248/49 |
| 6,364,255 B1 * | 4/2002 | Carrick et al. .................. 248/49 |
| 6,590,154 B1 * | 7/2003 | Badey et al. .................. 174/480 |
| 6,637,704 B2 * | 10/2003 | Jette ............................... 248/49 |
| 8,177,172 B2 * | 5/2012 | Quertelet et al. ............ 248/68.1 |
| 8,596,588 B1 * | 12/2013 | Sikkema et al. ................ 248/58 |
| 2011/0233345 A1 * | 9/2011 | Jette ............................... 248/60 |
| 2012/0175470 A1 | 7/2012 | Jette |

OTHER PUBLICATIONS

PCT Search Report & Written Opinion, Re: Application No. PCT/US2015/022127; dated Jun. 22, 2015.

* cited by examiner

*Primary Examiner* — Mark Wendell
(74) *Attorney, Agent, or Firm* — Bart A. Perkins

(57) ABSTRACT

A wire management device can facilitate the organization and retention of a plurality of wires. The wire management device may include a plurality of semi-enclosed arms through which a plurality of wires can be passed. The plurality of semi-enclosed arms can support the plurality of wires, and one or more of the wires can be directed outside of the wire management device, at various positions along the wire management device, through gaps between adjacent semi-enclosed arms. In some implementations, flexible cable retainer(s) can be attached to the plurality of semi-enclosed arms and can be operable to preclude wires from being inadvertently removed from the wire management device.

17 Claims, 4 Drawing Sheets

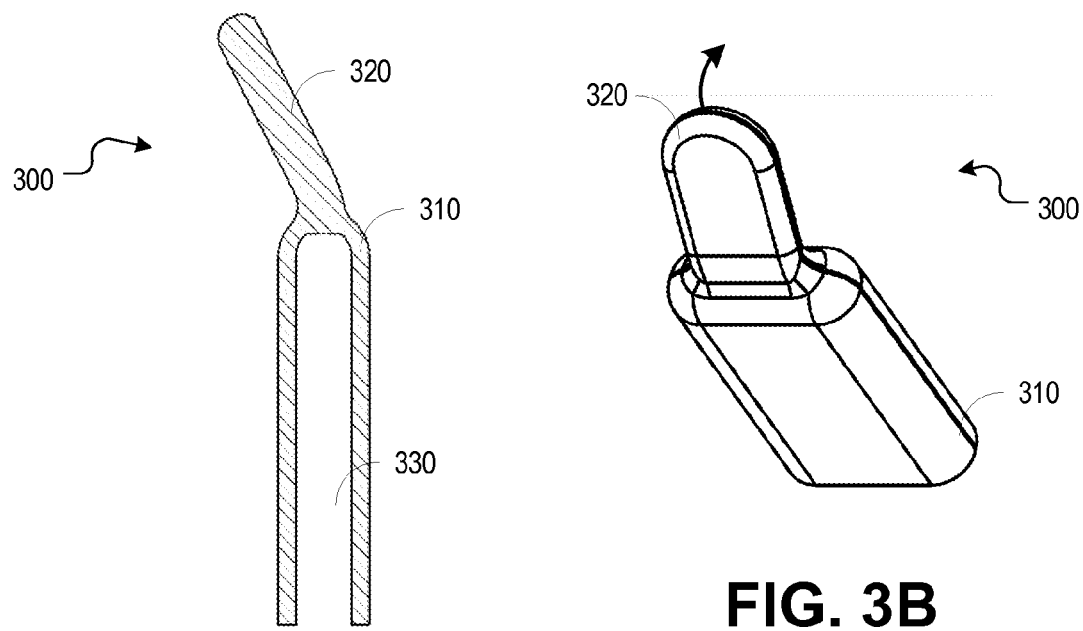
FIG. 3A
FIG. 3B
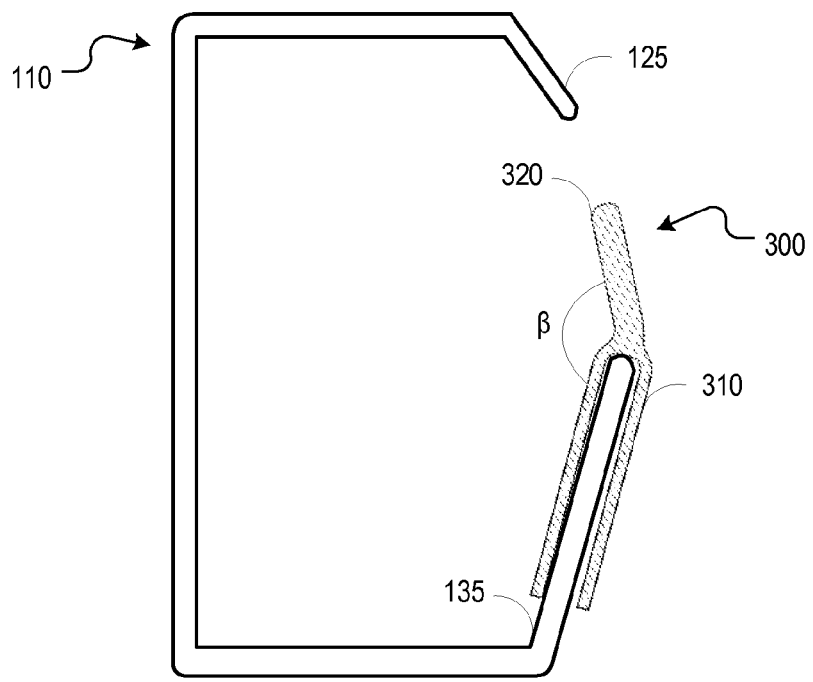
FIG. 4

US 9,188,248 B2

CABLE MANAGEMENT DEVICE

TECHNICAL FIELD

This disclosure relates to an apparatus for managing and retaining cables used in conjunction with a device.

BACKGROUND

The growing use of various network devices and the expansion of interoperability between machines have led to the use of numerous and varying cables with each device that is connected to a network. The use of numerous cables in conjunction with a device can create organization and storage issues and can further create the potential for damage to cables that are allowed to move against other cables or surfaces. As an example, issues with retaining and organizing cables exist in network equipment located at a service provider's station (e.g., routers, hubs, etc.). A need exists for an apparatus that is operable to effectively retain and organize cables that are associated with a device.

BRIEF DESCRIPTION OF THE DRAWINGS

FIG. 3A is a cross-sectional side view of an apparatus operable to retain a plurality of cables in a cable management device.

FIG. 3B is a perspective view of an apparatus operable to retain a plurality of cables in a cable management device.

FIG. 4 is a side view of a flexible cable retainer affixed to an arm of a cable management device.

Like reference numbers and designations in the various drawings indicate like elements.

DETAILED DESCRIPTION

Devices that are used in conjunction with any type of cable are subject to various issues that are created by disorganized and/or unrestrained cables. Unrestrained cables can hinder the ease in moving or storing a device. Moreover, unrestrained cables can create a potential for damaging the cables when the cables are free to move over other cables or surfaces. Issues created by unrestrained cables are exaggerated when unrestrained cables are present in greater numbers. For example, network equipment, such as an edge router, can have numerous ports, interface(s), or interface cards, and the use of such network equipment can therefore require numerous cables. Disclosed herein are various embodiments of an apparatus operable to provide an effective device which manages, organizes and retains cables.

Figure 1A:
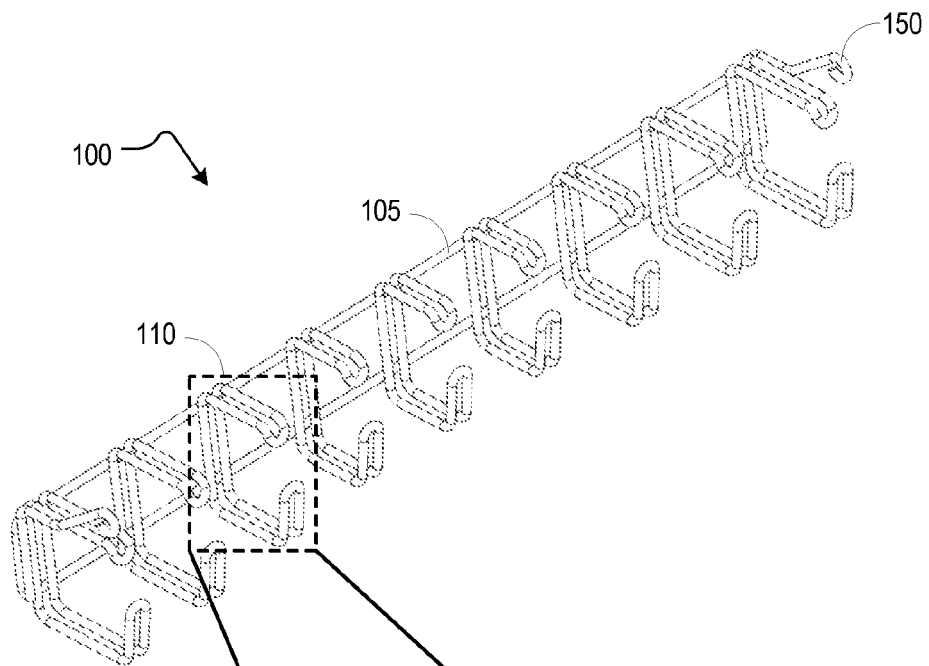
FIG. 1A is a perspective view of an apparatus operable to manage and retain a plurality of cables.

FIG. 1A is a perspective view of a cable management device 100 operable to manage and retain a plurality of cables. In embodiments, a cable management device 100 may include a support member 105 and a plurality of semi-enclosed arms 110. In embodiments, the plurality of semi-enclosed arms can be arranged so that the enclosed area of each semi-enclosed arm is parallel to the enclosed area of one or more adjacent semi-enclosed arms.

In embodiments, the support member 105 can be a member having a plurality of openings. For example, the support member 105 can be a solid, flat member having one or more openings (e.g., gaps, holes, etc.), wherein the one or more openings are so dimensioned as to allow one or more cables to pass through each opening. In embodiments, the support member 105 may include one or more bars (e.g., tubing, piping, etc.). For example, the support member 105 can be a rigid member (e.g., solid structure, hollow tube, etc.) that forms an enclosed rectangular shape. In embodiments, the support member 105 can be made from a variety of rigid, lightweight materials (e.g., a plastic, a metal, an alloy, etc.).

In embodiments, the support member 105 may include one or more connectors (e.g., bracket, hinge, pin, spring, latch, etc.) that are operable to allow the cable management device 100 to be attached to a device. For example, one or more brackets having a hole through which to pass a fastener (e.g., screw, pin, nail, etc.) can be located on the support member 105.

Figure 1B:
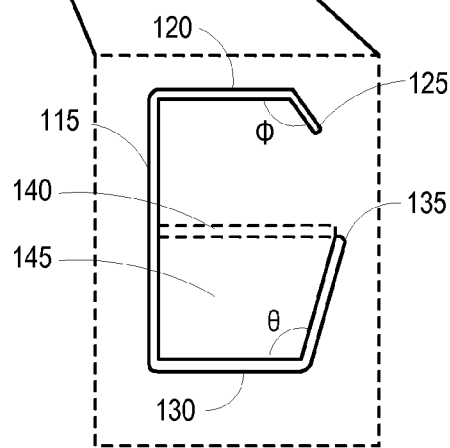
FIG. 1B is a cross-sectional side view of a semi-enclosed arm.

FIG. 1B is a cross-sectional side view of a semi-enclosed arm 110. In embodiments, each semi-enclosed arm 110 may include a single semi-enclosed member (e.g., solid structure, hollow tube, etc.). In embodiments, each of the plurality of semi-enclosed arms 110 may include a back support 115, an upper arm 120, an upper lip 125, a lower arm 130, and a lower lip 135. In embodiments, the semi-enclosed arms 110 may include a rigid tube or pipe that doubles back on itself. For example, each semi-enclosed arm 110 may include a single rigid tube that is molded to form two semi-enclosed shapes (e.g., the shape shown in FIG. 1B) adjacent to each other. In embodiments, each semi-enclosed arm 110 may include two or more semi-enclosed shapes (e.g., the shape shown in FIG. 1B) mounted to the support member 105 of FIG. 1 adjacent to each other with, or without a gap in between each of the two or more semi-enclosed shapes. The semi-enclosed arms 110 can be made from a variety of rigid, lightweight materials (e.g., plastic, metal, alloy, etc.), and all portions may be made from a single material or different portions may be made from a plurality of different materials (e.g., a metal lower arm 130 and a plastic upper lip 125).

The upper lip 125 and lower lip 135 can extend away from the upper arm 120 and lower arm 130, respectively, at various angles, which may be the same angle or different angles from each other. For example, the angle between the lower arm 130 and lower lip 135 (e.g., $\theta$) can be greater than the angle between the upper arm 120 and upper lip 125 (e.g., $\phi$). In embodiments, the lower arm 130 and lower lip 135 can be longer than the upper arm 120 and upper lip 125, respectively. The angles $\theta$ and $\phi$, and the lengths of the lower arm 130, lower lip 135, upper arm 120, and upper lip 125 can be varied so as to create a specific distance between the tip of the upper lip 125 and the tip of the lower lip 135.

In embodiments, one or more cables can be passed through either end of the cable management device 100 or can be inserted into the cable management device through the gap between the upper lip 125 and lower lip 135 on one or more of the respective semi-enclosed arms 110. In embodiments, a plurality of cables passing through the plurality of semi-enclosed arms 110 can rest on one or more of the components of the semi-enclosed arms (e.g., back support 115, upper arm 120, upper lip 125, lower arm 130, lower lip 135) or the support member 105, depending on the orientation or position of the cable management device 100.

In embodiments, a plate 140 can be positioned at the center of the opening 145 created by the plurality of semi-enclosed arms 110 and can run parallel to the support member 105 for the length of the cable management device 100. The plate 140 can be operable to separate two sets of cables that are within the cable management device. For example, a first set of cables that are destined for an upper portion of a device can be passed through an upper cavity of the cable management device (e.g., the area between the plate 140 and the plurality of lower lips 135), and a second set of cables that are destined for a lower portion of a device can be passed through a lower cavity of the cable management device (e.g., the area between the plate 140 and the plurality of back supports 115).

As illustrated in FIG. 1A, the cable management device 100 can further comprise one or more fastener rods 150. For example, a fastener rod 150 can be attached to each edge of the support member 105. As another example, a fastener rod 150 can be attached to each of the outermost semi-enclosed arms 110. In embodiments, a fastener rod 150 may include a rigid tube or pipe that extends off of the cable management device 100 (e.g., the fastener rod can extend off the wire management device at a variety of angles) and can form a loop at one end of the fastener rod. For example, the loop formed at the end of each fastener rod 150 can be dimensioned so as to allow a connector to be passed through the loops, and the cable management device 100 can be pivoted to multiple positions by rotating the wire management device around the connectors.

Figure 2:
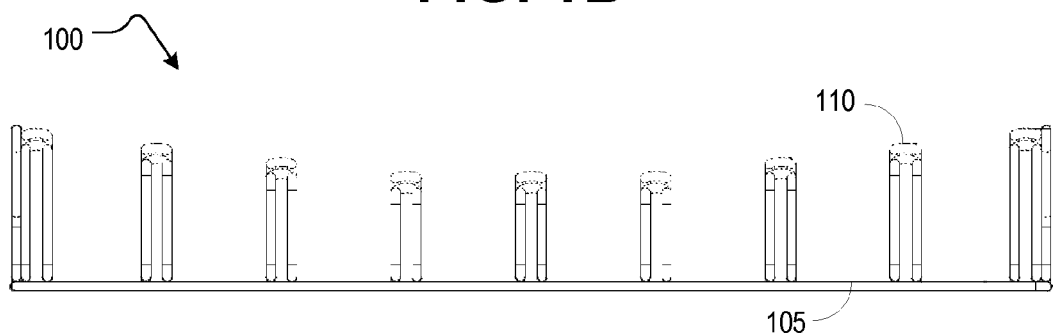
FIG. 2 is a front view of an apparatus operable to manage and retain a plurality of cables.

FIG. 2 is a front view of a cable management device 100 operable to manage and retain a plurality of cables. In embodiments, each of a plurality of semi-enclosed arms 110 can extend in an outward direction away from the support member 105. In embodiments, the distance over which each of the plurality of semi-enclosed arms 110 extend away from the support member 105 can vary relative to each other. For example, the semi-enclosed arm(s) 110 positioned at the outside edges of the support member 105 can have the longest distance from the support member 105, and the distance from the support member 105 can decrease at each semi-enclosed arm 110 moving from the outer-most semi-enclosed arm 110 to the semi-enclosed arm(s) 110 positioned at the center of the support member 105. By dimensioning the semi-enclosed arms 110 smaller from the outside to the inside of the support member 105, the weight of the cable management device 100 can be minimized without taking away from the functionality of the device. Generally, as a plurality of wires pass through the plurality of semi-enclosed arms 110 (e.g., from the outside edge(s) of the device toward the center of the device), a portion of the plurality of wires will be passed outside of the device, thereby reducing the number of wires that will be passed through the centrally positioned semi-enclosed arms 110.

FIG. 3A is a cross-sectional side view of a cable retainer 300 operable to retain a plurality of cables in a cable management device 100. In embodiments, the cable retainer 300 may include a lip cover 310 and a flexible flange 320. In embodiments, the lip cover 310 can be a hollow member having an open end at the base of the lip cover. For example, the lip cover 310 may include a cavity 330, wherein the cavity 330 is dimensioned so as to fit over a section of a semi-enclosed arm 110 of FIG. 1 (e.g., lower lip 135 of FIG. 1).

FIG. 3B is a perspective view of a cable retainer 300 operable to retain a plurality of cables in a cable management device 100. In embodiments, the lip cover 310 and the flexible flange 320 can be made from various flexible materials (e.g., flexible plastic, metal, alloy, silicone rubber, etc.).

FIG. 4 is a side view of a cable retainer 300 affixed to an arm of a cable management device 100. In embodiments, the flexible flange 320 can be dimensioned so as to partially or entirely cover the gap between the upper lip 125 and lower lip 135. For example the length of the flexible flange 320 and the angle between the flexible flange and the lip cover 310 (e.g., the angle β) can be based upon multiple factors (e.g., the number and size(s) of cables to be retained, the orientation of operating and storage positions of the cable management device, a desired level of ease for inserting or removing cables into or from the cable management device, etc.).

In embodiments, the cable retainer 300 can be made of a material (e.g., flexible plastic, metal, alloy, silicone rubber, etc.) that is fitted to cause the lip cover 310 to securely grip the surfaces of a lower lip 135. In embodiments, the thickness of the flexible flange 320 can be dimensioned so as to allow the flexible flange to be pushed or pulled to an open position when one or more cables are inserted into or removed from the cable management device 100. In embodiments, the cable retainer 300 can be made from a rigid material and can be removed from a lower lip 135 in order to insert a cable into the cable management device 100.

Figure 5:
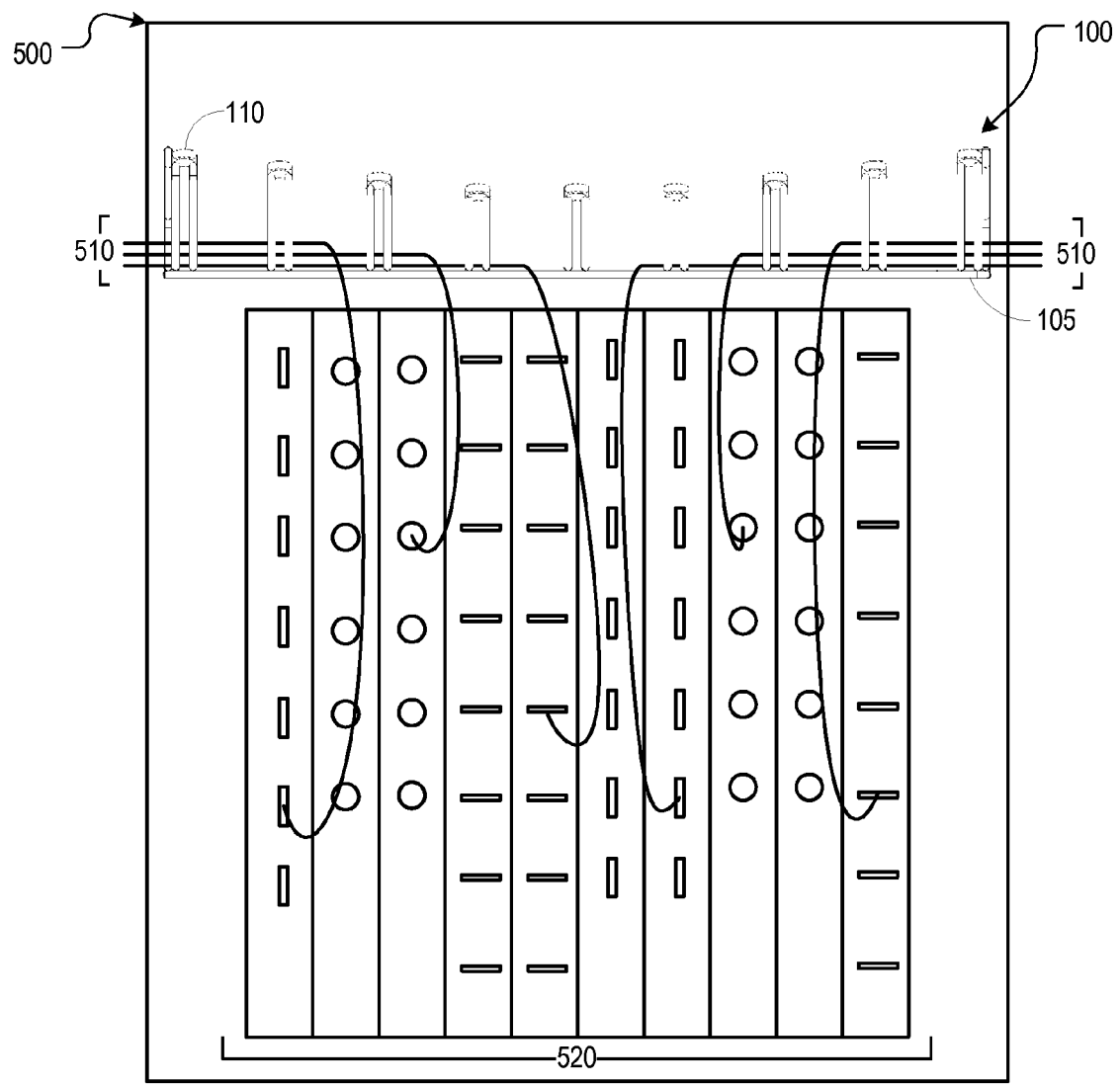
FIG. 5 is an illustration showing a cable management device affixed to a wired device.

FIG. 5 is an illustration showing a cable management device 100 affixed to a wired device 500. It should be understood that a cable management device 100 can be used in conjunction with various other devices. In embodiments, a plurality of cables (e.g., cables 510) can be passed through one or more semi-enclosed arms 110. As the plurality of cables pass through the one or more semi-enclosed arms 110, the cables can rest on the support member 105 and/or one or more back supports 115. In embodiments, each of the plurality of cables 510 can be passed through one or more semi-enclosed arms 110 until the cable reaches a position in the cable management device 100 that is above a target destination (e.g., one of the interface cards 520) associated with the cable. When the cable reaches a position in the cable management device 100 above the target destination, the cable can be passed through a gap between adjacent semi-enclosed arms 110 to a position outside of the cable management device and can be pulled to a target destination (e.g., to an interface on one of the interface cards 520).

Figure 6:
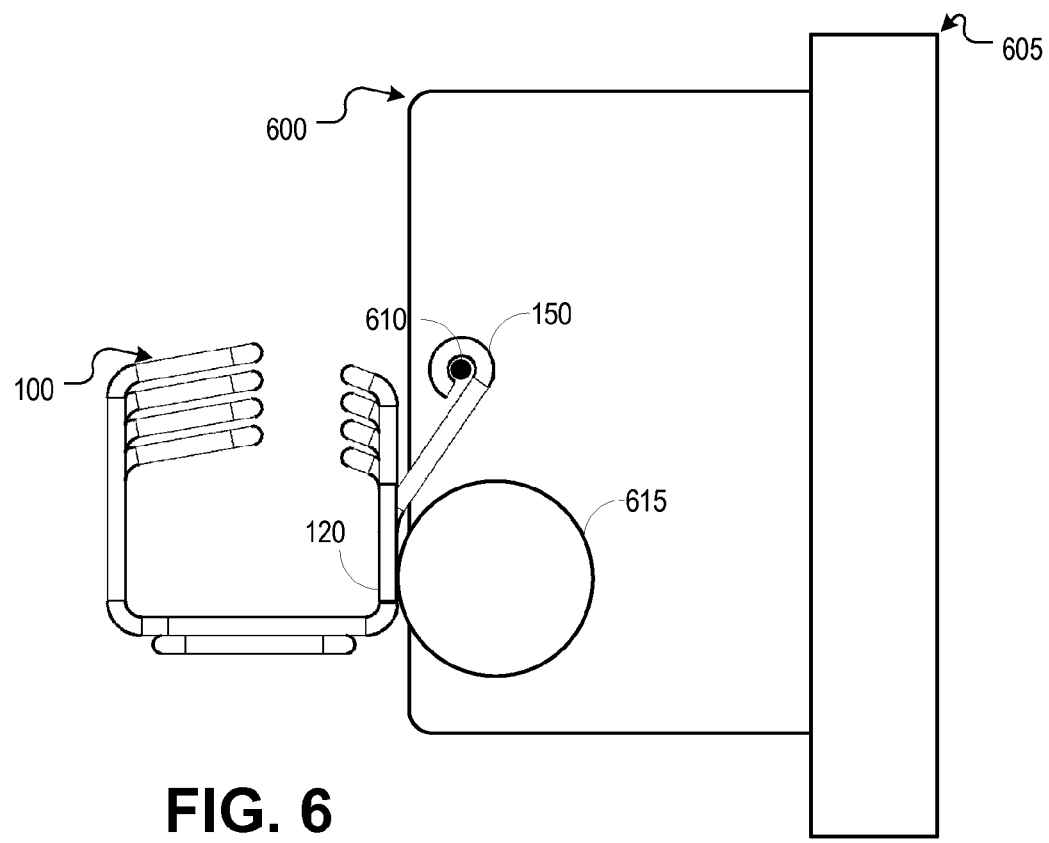
FIGS. 6 and 7 illustrate a housing with a cable management device attached in different positions.

FIG. 6 is a side view of a housing 600 with a cable management device 100 attached in an unfolded position. In some implementations, the cable management device 100 can be affixed to a device 605 by way of one or more fastener rods 150. For example, a fastener rod 150 can be attached to the cable management device 100 at each end of the cable management device and the end of each fastener rod can form a loop. In embodiments, the loop formed at the end of each fastener rod 150 can be dimensioned so as to wrap around a connector (e.g., pin 610). The pin 610 can be attached to and extend away from a surface of the device to which the cable management device 100 is being affixed. It should be understood that the loop formed by each fastener rod 150 and each pin 610 can be made of various materials and can be dimensioned based on the size and/or weight of the cable management device 100.

When the cable management device 100 is in an operating position, one or more of the upper arms 120 can rest against a surface that is operable to hold the cable management device in place (e.g., a chock 615). For example, each of the upper arms 120 located at each end of the cable management device 100 can rest against a chock 615. In embodiments, a chock 615 can be attached to and extend away from a surface of the device to which the cable management device 100 is being affixed (e.g., the housing 600). As an example, a chock 615 can be located at each end of the housing 600 and can extend from one end of the housing 600 to the other end of the housing 600 or can extend away from the housing 600 at any of a variety of distances. As another example, a chock 615 can be located on one side of the housing 600. It should be understood that the chock 615 can be of various sizes, shapes and materials. In embodiments, the chock 615 can be temporarily or permanently affixed to the housing 600.

Figure 7:
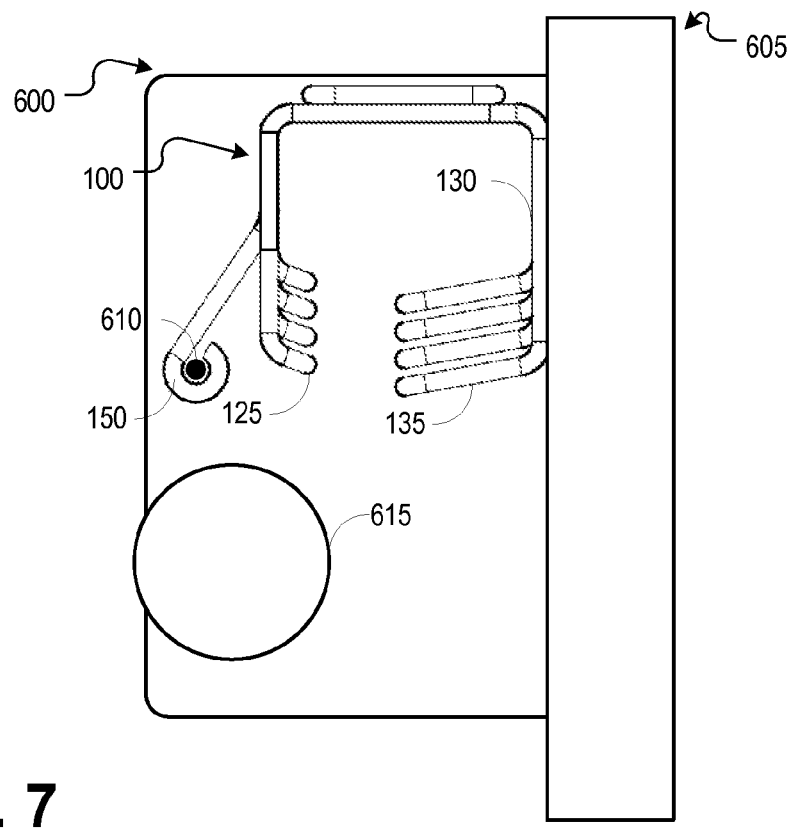

FIG. 7 is a side view of a housing 600 with a cable management device 100 attached in a folded position. In embodiments, the cable management device 100 can be folded from an operating position into a storage position by pivoting the cable management device around a pin 610. In embodiments, the cable management device 100 can be secured in a storage position by resting one or more lower arms 130 against a surface of the device to which the cable management device is being affixed (e.g., against the back surface of a device 605).

In embodiments, the lower lip(s) 135 can be dimensioned so as to preclude one or more wires from falling outside of the cable management device 100. For example, the length of each lower lip 135 can be dimensioned so as to minimize the gap between the lower lip(s) 135 and upper lip(s) 125. In embodiments, the lower lip(s) 135 can be dimensioned so as to allow a peripheral apparatus (e.g., cable retainer 300 of FIG. 3) to be attached to the lower lip(s). For example, a cable retainer 300 can be affixed to each lower lip 135 and can be dimensioned so as to enclose or nearly enclose the gap between the ends of the lower lip(s) 135 and upper lip(s) 125. In embodiments, the cable retainer(s) 300 can be made of a flexible material (e.g., rubber) in order to allow one or more cables to be inserted into the cable management device 100 through the cable retainer(s).

It is, of course, not possible to describe every conceivable combination of components or methodologies for purposes of describing the claimed subject matter, but one of ordinary skill in the art can recognize that further combinations and permutations of such matter are possible. Accordingly, the claimed subject matter is intended to embrace all such alterations, modifications and variations that fall within the spirit and scope of the appended claims.

We claim:

1. An apparatus for managing a plurality of wires, comprising:
   a back support;
   a plurality of semi-enclosed arms attached to the back support, wherein each of the plurality of semi-enclosed arms comprises a gap, and wherein each of the plurality of semi-enclosed arms is operable to allow one or more of the plurality of wires to pass through a cavity created by the semi-enclosed arm; and
   at least two arms, one arm at each end of the back support, each arm comprising an attachment mechanism for attaching the apparatus to a surface, wherein each arm extends away from the back support at an angle sufficient to create a pivot point allowing the apparatus to be rotated about an axis running between each pivot point from a first position to a second position, wherein the back support is in between the gaps of the semi-enclosed arms and the surface when the apparatus is in the first position, and the gaps of the semi-enclosed arms are in between the back support and the surface when the apparatus is in the second position.

2. The apparatus of claim 1, wherein at least one arm of the plurality of semi-enclosed arms comprises:
   an upper arm;
   an upper lip extending off of the upper arm;
   a lower arm; and
   a lower lip extending off of the lower arm.

3. The apparatus of claim 2, wherein the lower arm is longer than the upper arm.

4. The apparatus of claim 2, wherein the lower lip is longer than the upper lip.

5. The apparatus of claim 1, wherein the plurality of semi-enclosed arms are arranged so that the enclosed area of each semi-enclosed arm is parallel to the enclosed area of one or more adjacent semi-enclosed arms.

6. The apparatus of claim 5, wherein a lower portion and an upper portion of distally positioned semi-enclosed arms are longer than a lower portion and an upper portion respectively of the one or more semi-enclosed arms that are positioned in between the distally positioned semi-enclosed arms, such that the area of the enclosures of the distally positioned semi-enclosed arms is larger than the area of the enclosures of the one or more semi-enclosed arms that are positioned between the distally positioned semi-enclosed arms.

7. The apparatus of claim 5, wherein a lower portion and an upper portion of each of the plurality of semi-enclosed arms are longer than a lower portion and an upper portion respectively of a proximally adjacent semi-enclosed arm, such that the area of the enclosures of each of the plurality of semi-enclosed arms is larger than the area of the enclosure of the proximally adjacent semi-enclosed arm.

8. The apparatus of claim 1, further comprising:
   a plate running substantially across the apparatus of claim 1 on a plane parallel to the plane formed between the upper and lower planes of the plurality of semi-enclosed arms, wherein the plane is located between the upper and lower planes of the plurality of semi-enclosed arms, and wherein the plate forms an upper enclosed area and a lower enclosed area within the enclosure of each semi-enclosed arm.

9. The apparatus of claim 1, wherein the back support comprises an open area enclosed by rigid tubing.

10. The apparatus of claim 9, wherein the back support further comprises means for attaching the apparatus of claim 9 to a device.

11. The apparatus of claim 1, wherein the plurality of semi-enclosed arms are positioned parallel to each other and each of the plurality of semi-enclosed arms comprises at least two surfaces that are operable to support the plurality of wires.

12. An apparatus for retaining a plurality of wires, comprising:
   a hollow member having at least one opening, wherein the hollow member and at least one opening are dimensioned so as to be placed onto one of the semi-enclosed arms of the apparatus of claim 1; and
   a flange attached to the hollow member.

13. An apparatus for managing a plurality of wires, comprising:
   a back support;
   a plurality of semi-enclosed arms, wherein each of the plurality of semi-enclosed arms is operable to allow one or more of the plurality of wires to pass through a cavity created by the semi-enclosed arm; and wherein each of the plurality of semi-enclosed arms comprises:
     an upper arm;
     an upper lip extending off of the upper arm;
     a lower arm; and
     a lower lip extending off of the lower arm; and
   one or more hollow members comprising at least one opening and a flexible flange, wherein each hollow member is attached to a semi-enclosed arm, and wherein the flexible flange is dimensioned so as to substantially cover a gap between the tip of the upper lip and the tip of the lower lip.

14. The apparatus of claim 13, wherein the hollow member is placed on the lower lip of one or more of the plurality of semi-enclosed arms.

15. The apparatus of claim 13, wherein the back support comprises an open area enclosed by rigid tubing.

16. The apparatus of claim 13, wherein the plurality of semi-enclosed arms are attached to the back support and are arranged so that the enclosed area of each semi-enclosed arm is parallel to the enclosed area of one or more adjacent semi-enclosed arms.

17. An apparatus for retaining a plurality of wires, comprising:
- a hollow member having at least one opening, wherein the hollow member and at least one opening are dimensioned so as to be placed onto a semi-enclosed arm, the semi-enclosed arm comprising:
  - an upper arm;
  - an upper lip extending off of the upper arm;
  - a lower arm; and
  - a lower lip extending off of the lower arm;
- a flange attached to the hollow member; and
- wherein the flexible flange is dimensioned so as to substantially cover a gap between the tip of the upper lip and the tip of the lower lip.

\* \* \* \* \*